(12) United States Patent
Kirklin et al.

(10) Patent No.: US 8,192,881 B2
(45) Date of Patent: Jun. 5, 2012

(54) CONTROL METHOD FOR COLD FUEL CELL SYSTEM OPERATION

(75) Inventors: Matthew C. Kirklin, Pittsford, NY (US); Prem C. Menon, Pittsford, NY (US); Bruce J. Clingerman, Palmyra, NY (US)

(73) Assignee: GM Global Technology Operations LLC, Detroit, MI (US)

( * ) Notice: Subject to any disclaimer, the term of this patent is extended or adjusted under 35 U.S.C. 154(b) by 950 days.

(21) Appl. No.: 11/774,738

(22) Filed: Jul. 9, 2007

(65) Prior Publication Data

US 2009/0017340 A1   Jan. 15, 2009

(51) Int. Cl.
*H01M 8/02*   (2006.01)
(52) U.S. Cl. ........ 429/433; 429/428; 429/442; 429/443; 429/444; 429/446
(58) Field of Classification Search .................. 429/428, 429/433, 442, 443, 444, 446, 513, 545
See application file for complete search history.

(56) References Cited

U.S. PATENT DOCUMENTS

| | | | |
|---|---|---|---|
| 6,394,207 B1 | 5/2002 | Skala | |
| 6,936,359 B2 | 8/2005 | Kobayashi et al. | |
| 2005/0129992 A1 | 6/2005 | Busenbender | |
| 2005/0260466 A1* | 11/2005 | Kobayashi et al. | 429/13 |
| 2007/0231639 A1* | 10/2007 | Yoshida et al. | 429/22 |

FOREIGN PATENT DOCUMENTS

| | | |
|---|---|---|
| DE | 10126090 A1 | 2/2002 |
| DE | 10329041 A1 | 1/2005 |

OTHER PUBLICATIONS

DE 10 2008 031 969.4 Office Action; Dated: Aug. 12, 2011; 6 pages.

* cited by examiner

*Primary Examiner* — Patrick Ryan
*Assistant Examiner* — Ben Lewis
(74) *Attorney, Agent, or Firm* — BrooksGroup

(57) ABSTRACT

A method of operating a fuel cell system comprising a fuel cell and a compressor that provides air to the fuel cell. The method comprises sensing a temperature indicative of the temperature of a fuel cell, providing a restriction in an air flow path to the fuel cell when the sensed temperature is below a threshold, and increasing the speed of the compressor to provide a desired air flow to the fuel cell. In at least some implementations, increasing the speed of the compressor increases the power drawn from the fuel cell to power the compressor and helps to increase the heat of the fuel cell. The increased speed of the compressor can also result in warmer air flow from the compressor that can further increase the temperature of the system components.

14 Claims, 1 Drawing Sheet

CONTROL METHOD FOR COLD FUEL CELL SYSTEM OPERATION

TECHNICAL FIELD

The field to which the present disclosure generally relates includes fuel cells, fuel cell components, fuel cell control systems, and method of using and operating the same.

BACKGROUND

Fuel cells have been proposed as a power source for many applications, for example, as a primary power source in vehicles and the like. To meet customer expectations in vehicle applications, the fuel cell should be capable of quick start-up. At relatively high ambient temperatures (e.g. about 20° C. or above) a fuel cell stack, which may include a plurality of individual fuel cells bundled together, can be started and reach acceptable operating conditions in a reasonable amount of time. In some applications, the preferred operating temperature may be around 80° C.

At relatively low temperatures, such as subfreezing temperatures of about −25° C., rapid startup of the fuel cell stack is more difficult because at these temperatures the rate at which the overall electrochemical reaction occurs is significantly reduced. This limits the amount of current that can be drawn from the stack and the resultant heat output by the stack. The reduced output of the fuel cell stack can degrade drive-away performance of the vehicle, as well as slow the rate at which the interior vehicle cabin can be heated, the rate at which windshield defrost mechanisms operate, and the like.

SUMMARY OF EXEMPLARY EMBODIMENTS OF THE INVENTION

One embodiment includes a method of operating a fuel cell system comprising a fuel cell and a compressor that provides air to the fuel cell. The method comprises sensing a temperature indicative of the temperature of a fuel cell, providing a restriction in an air flow path to the fuel cell when the sensed temperature is below a threshold, and increasing the speed of the compressor to provide a desired air flow to the fuel cell. In at least some implementations, increasing the speed of the compressor increases the power drawn from the fuel cell to power the compressor and helps to increase the heat of the fuel cell. The increased speed of the compressor can also result in warmer air flow from the compressor that can further increase the temperature of the system components.

Another embodiment of the invention includes a fuel cell system, comprising at least one fuel cell, a compressor having an output communicated with the fuel cell to provide a forced air flow to the fuel cell, and at least one flow controller disposed between the compressor output and the fuel cell and through which the forced air from the compressor flows to the fuel cell. The flow controller may be a valve or valves that provide(s) a variable restriction of the area for air to flow through the valve(s). The system may further include an air flow sensor adapted to provide a signal indicative of the flow rate of air to the fuel cell, a temperature sensor adapted to provide a signal indicative of at least one of ambient temperature or a temperature of the fuel cell, and a control system. The control system may be communicated with the air flow sensor, the temperature sensor, the compressor and the valve(s) and capable of providing a signal to the valve(s) to increase the restriction to air flow through the valve(s) when the temperature sensor provides a signal indicative of a temperature below a threshold. The control system may also provide a signal to control the compressor operation to provide a determined air flow to the fuel cell even when the valve(s) reduce(s) the area for air to flow therethrough.

Other exemplary embodiments of the present invention will become apparent from the detailed description provided hereinafter. It should be understood that the detailed description and specific examples, while disclosing exemplary embodiments of the invention, are intended for purposes of illustration only and are not intended to limit the scope of the invention.

BRIEF DESCRIPTION OF THE DRAWINGS

Exemplary embodiments of the present invention will become more fully understood from the detailed description and accompanying drawings, wherein.

DETAILED DESCRIPTION OF EXEMPLARY EMBODIMENTS

Figure 1:
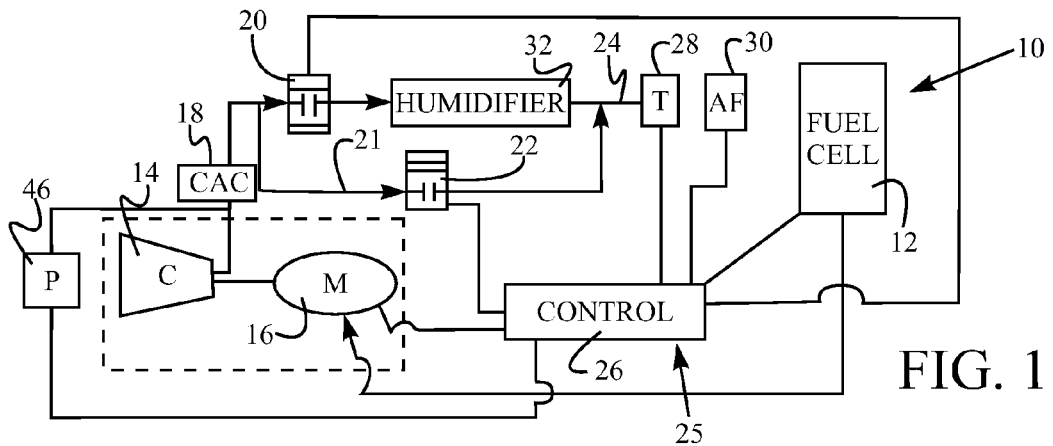
FIG. 1 schematically depicts a control system to improve the cold start performance of a fuel cell stack.

Referring in more detail to the drawings, FIG. 1 illustrates a control system for a fuel cell power system 10 such as may be utilized in a vehicle application. The fuel cell architecture and its controls may be of any conventional or hereinafter developed form. In the embodiment shown in FIG. 1, the fuel cell power system 10 includes at least one fuel cell or fuel cell cell stack 12. A compressor 14 is provided and is driven by an electric motor 16. The compressor 14 provides a forced air flow to the cathode side of the fuel cell stack 12, and this forced air flow may be humidified in a humidifier 32, and its pressure controlled by a pressure regulator or by feedback control of its motor using an appropriate pressure sensor 46. The forced air flow may be provided to the fuel cell stack 12 through an air cooler 18 designed to reduce the temperature of undesirably heated air so that the air flow to the fuel cell 12 is within a desired temperature range for operation of the fuel cell. One or more variable flow restrictors, such as flow control valves 20, 22, may be disposed between the compressor output and the fuel cell stack 12 to control the flow rate of the air flow to the stack 12. In one embodiment, control valve 22 is provided in a bypass line 21 around the humidifier 32.

In the embodiment shown, there are two flow control valves 20, 22 with one valve 22 connected in parallel to the other valve 20 and the cathode humidifier 32. Accordingly, a portion of the output air flow from the compressor 14 passes through one valve 20 and then the cathode humidifier 32, while a separate portion bypasses the cathode humidifier 32 and passes through the second valve 22. In the embodiment shown, the divided air flows converge downstream of the cathode humidifier 32 and are delivered to the fuel cell stack in a single conduit 24, although other arrangements may be utilized.

In one implementation, the control system 25 may include one or more controllers 26 operably communicated with the compressor 14, the fuel cell stack 12, the air flow control valves 20, 22 and with one or more sensors to control at least certain aspects of the fuel cell power system operation. The controller 26 may include one or more discreet control units which may be communicated together, or the controller may include a single controller that controls at least the functions described hereinafter. An exemplary sensor that may be used with the fuel cell power system 10 includes a temperature sensor 28 that provides to the controller 26 a signal indicative of the temperature of the air entering fuel cell stack 12, or the temperature of the fuel cell stack 12 itself or the ambient temperature, or any combination of them. Another exemplary sensor may include an air flow sensor 30 that provides a signal to the controller 26 indicative of the air flow rate delivered from the compressor 14 to the fuel cell stack 12.

When the fuel cell power system 10 is subjected to relatively cold ambient temperatures, the temperature of the fuel cell stack 12 can become lower than its desired operating temperatures for optimum power supply operation. When the temperature sensed by the temperature sensor 28 is below a threshold, the controller 26 partially closes at least one of the air flow valves 20, 22 to reduce the effective flow area through one or both valves. For example, the threshold can be any suitable value below the desired operating temperature of the fuel cell stack 12. Reducing the effective flow area of one or both valves 20, 22 tends to increase the pressure of the air flow between the compressor and valves 20, 22, and reduce the flow rate. To avoid providing air at an increased pressure and a reduced flow rate to the fuel cell stack 12, the controller 26 also provides a signal to the compressor motor 16 to increase its rotational speed. In this manner, the compressor 14 requires more energy to provide the same amount of air to the fuel cell stack 12.

Figure 2:
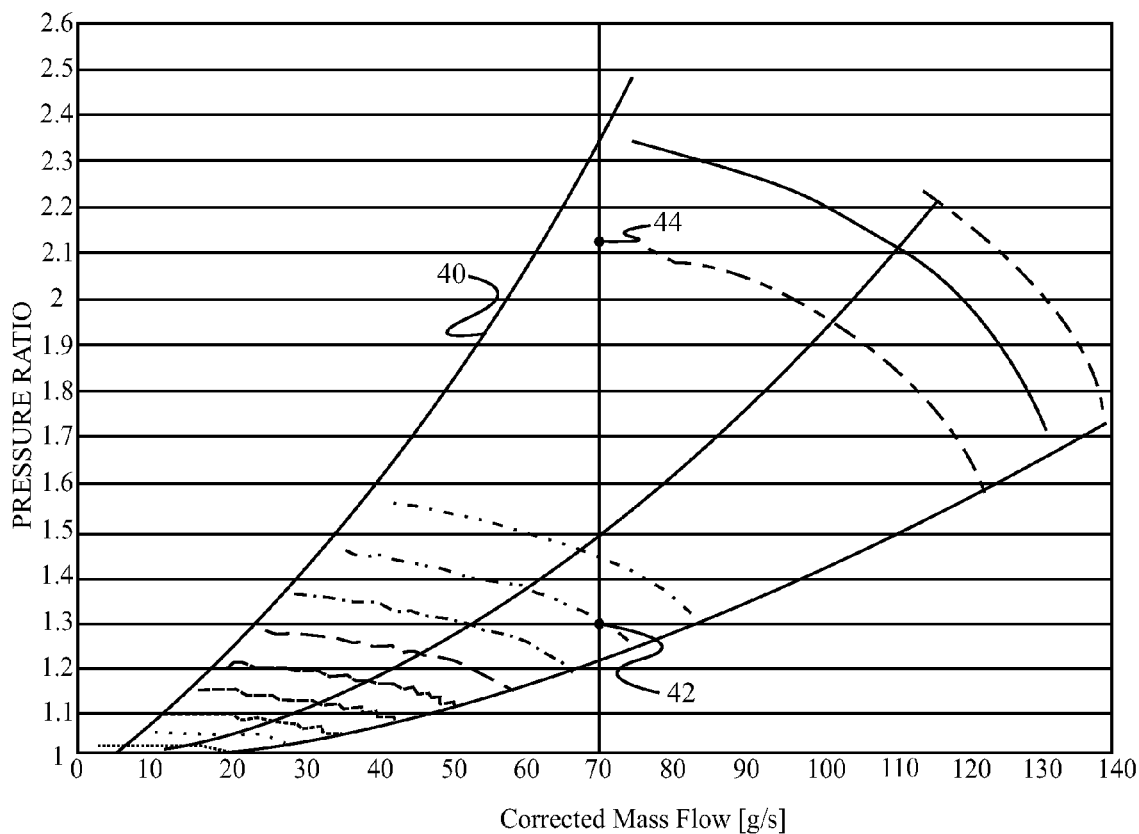
FIG. 2 is a graph of compressor pressure ratio and air mass flow rate.

Because the compressor 14 draws power from the fuel cell stack 12, the stack has to supply additional power to run the compressor at its increased speed and pressure ratio. Because the fuel cell stack 12 efficiency may be low during cold temperature operation, additional waste heat is generated by the stack 12 to produce the extra power for the compressor motor 16. Accordingly, the waste heat generated by the stack 12 contributes to an increased rate of warming of the stack 12 and subsequent more efficient operation of the fuel cell system 10. For example, as shown in FIG. 2, significantly higher pressure ratios can be used while staying below the surge line 40. At a corrected mass flow rate of 70 g/s, the compressor 14 in one implementation might operate with about 3.5 kW of power and have an output air temperature of about 13° C. under normal operating conditions, as noted by plot point 42. The compressor may operate with about 11.63 kW of power and an output air temperature of about 46° C. when the air flow is restricted and the compressor pressure ratio is increased; as shown by plot point 44. Accordingly, in one exemplary implementation, the compressor 14 requires over 8 kilowatts (kW) of additional power to push the same concentration of oxygen through the restricted or partially closed air flow valves 20, 22 and to the fuel cell stack 12 compared to when the air flow valves 20, 22 are in their normal position for normal operation of the fuel cell system 10. And the stack 12 produces an increased amount of waste heat to produce the extra power for the compressor motor 16.

As noted above, the increased compressor speed and power consumption provides a higher temperature of the air discharged from the compressor 14. This warmer air passes through the air cooler 18 and helps heat the air cooler 18 and any cooling fluid therein. The heated fluid may be circulated through the fuel cell stack 12 to heat the same. The fuel cell stack 12 is further heated upon delivery of the increased temperature air flow thereto. In the example shown in FIG. 2, the system can be controlled so that over 8 kW of additional power can be required to drive the compressor motor 16 to deliver the same or similar mass of air to the fuel cell stack 12 during start-up compared to the power requirement without throttling down the valves 20, 22. In this example, of the 8 kW to drive the motor, about 70% of that may go into the airflow, or about 5.6 kW.

The control system 25 may use a feed forward model to calculate the position of or relative restriction to air flow of the air flow valves 20, 22 to maximize the compressor pressure ratio during the cold start or cold temperature operation. In some implementations, the position of the valves 20, 22 may be controlled as a function of a determined or desired pressure ratio of the compressor motor 16. A compressor pressure sensor 46 could also be used to provide feedback control of the position of the air flow valves based on the pressure at the outlet and/or across the compressor to determine the desired position of the valves. By maximizing or increasing the compressor pressure ratio, the amount of additional energy required to operate the compressor motor 16, and hence, the amount of additional energy required from the fuel cell stack 12, as well as a corresponding increase in the temperature of the air discharged from the compressor 14, can be controlled to facilitate warming up of the fuel cell power system 10. To maintain the air flow to the fuel cell stack 12 generally constant or within a desired range, the compressor motor 16 is preferably operated with a closed loop feedback control on the air flow sensor 30 so that the compressor speed is automatically increased to compensate for the partial closing of the air flow valves 20, 22. Because the total effective area of the two air flow valves 20, 22 determines the pressure ratio of the compressor 14, the compressor control loop can also be independent of RH controls.

Accordingly, by throttling the valves 20, 22 between the compressor 14 and the fuel cell stack 12, and then increasing the output of the compressor 14 so that the fuel cell stack 12 receives a desired air flow (e.g. a flow rate controlled as a function of a determined air flow rate), additional energy can be drawn from the stack 12 to power the compressor 14 and can be delivered to the stack 12 in the form of an increased temperature air flow. This improves the cold start performance and cold temperature operation of the fuel cell system 10, and increases the rate at which the fuel cell power system temperature is increased to thereby reduce the time of low temperature fuel cell stack operation.

The above description of embodiments of the invention is merely exemplary in nature and, thus, variations thereof are not to be regarded as a departure from the spirit and scope of the invention. By way of example without limitation, increasing the restriction to the compressor output air flow may be accomplished in ways other than partially closing one or more valves, such as by directing the air flow in full or in part through a different path when the restricted air flow is desired. Of course, still other arrangements may be utilized, as desired.

The invention claimed is:

1. A method of operating a fuel cell system comprising a fuel cell and a compressor that provides air to the fuel cell, the method comprising:
    sensing a temperature indicative of the temperature of the fuel cell;
    providing a restriction in an air flow path from the compressor to the fuel cell when the sensed temperature is below a threshold;
    sensing a pressure ratio across the compressor; and
    concurrently, controlling a restriction amount in the air flow path from the compressor to the fuel cell as a function of the sensed pressure ratio, and increasing the speed of the compressor to maintain a desired air flow to the fuel cell and to cause the air supplied to the fuel cell to increase in temperature, wherein the compressor simultaneously draws power from the fuel cell for increasing its speed which in turn generates heat by the fuel cell, and wherein the temperature of the fuel cell is increased.

2. The method of claim 1 wherein the fuel cell system also includes a flow controller disposed between the compressor and the fuel cell, and providing a restriction in the air flow path is accomplished by the flow controller.

3. The method of claim 2 wherein the flow controller includes a valve that provides a variable restriction in the air flow path reducing the cross-section area through which air may flow.

4. The method of claim 1 which also includes sensing the flow rate of air at the fuel cell and controlling the output of the compressor as a function of a determined air flow rate.

5. A fuel cell system, comprising:
at least one fuel cell;
a compressor located on an air-flow-supply side of the fuel cell and having an output communicated with the fuel cell to provide a forced air flow to the fuel cell, wherein the fuel cell is communicated with the compressor to provide power to the compressor to support operation of the compressor;
at least one flow controller disposed downstream the compressor and between the compressor output and the fuel cell and through which the forced air from the compressor flows to the fuel cell, the flow controller providing a variable restriction of the area for air to flow therethrough, wherein the flow controller selectively provides a reduced area for air to flow therethrough;
an air flow sensor adapted to provide a signal indicative of the flow rate of air to the fuel cell;
a temperature sensor adapted to provide a signal indicative of at least one of ambient temperature or a temperature of the fuel cell; and
a control system communicated with the air flow sensor, the temperature sensor, the compressor and the flow controller, the control system providing a signal to the flow controller to increase the restriction to air flow through the flow controller when the temperature sensor provides a signal indicative of a temperature below a threshold, and the control system providing a signal to control the compressor operation to provide a determined air flow rate to the fuel cell even when the flow controller reduces the area for air to flow therethrough, wherein the control system causes the compressor to provide an output flow rate with a higher pressure ratio which increases the power draw of the compressor from the fuel cell.

6. The system of claim 5 wherein when the compressor provides an output flow rate with a higher pressure ratio, the temperature of the air discharged from the compressor is increased.

7. The system of claim 6 which also includes an air cooler disposed between the compressor and the fuel cell and wherein the increased air temperature output from the compressor flows through the air cooler and heat is transferred to a fluid flowing through the air cooler.

8. The system of claim 5 wherein said at least one flow controller includes two valves disposed in parallel to each other, and a humidifier disposed between one of said two valves and the fuel cell to control the humidification of the air that flows therethrough and to the fuel cell.

9. The system of claim 5 wherein the control system uses feed forward control to control the restriction provided by said at least one flow controller.

10. The system of claim 9 wherein the control system maximizes the compressor pressure ratio by controlling the air flow through said at least one flow controller.

11. The system of claim 5 which also includes a pressure sensor that provides a signal indicative of the output pressure of the compressor, the pressure sensor being communicated with the control system.

12. A method, comprising:
powering a compressor with a fuel cell to provide air flow to the fuel cell;
sensing a temperature indicative of the temperature of the fuel cell; and
concurrently, providing a restriction in an air flow path downstream the compressor to the fuel cell when the sensed temperature is below a threshold, and increasing the output of the compressor by providing additional power from the fuel cell to the compressor to maintain a desired air flow rate to the fuel cell.

13. The method of claim 12 wherein the restricting includes reducing the effective flow area of a valve disposed between the compressor and the fuel cell.

14. The method of claim 12 which also includes sensing the pressure across the compressor and controlling the restriction to air flow to the fuel cell as a function of the pressure across the compressor.

* * * * *